United States Patent [19]

Keweza

[11] 4,259,077
[45] Mar. 31, 1981

[54] WIRELESS LOGIC TRAINER

[76] Inventor: Joseph T. Keweza, 6606 Robinhood La., Huntsville, Ala. 35806

[21] Appl. No.: 938,733

[22] Filed: Aug. 31, 1978

[51] Int. Cl.³ .......................................... G09B 23/18
[52] U.S. Cl. .................................................. 434/118
[58] Field of Search ............. 35/9 A, 9 R, 9 C, 9 D, 35/9 B, 10, 13, 19 A, 30

[56] References Cited

U.S. PATENT DOCUMENTS

| 3,071,876 | 1/1963 | Swanberg | 35/19 A |
| 3,309,793 | 3/1967 | Bartee | 35/13 |
| 3,340,620 | 9/1967 | Meade | 35/19 A |
| 3,363,333 | 1/1968 | Alexander | 35/10 X |
| 3,601,905 | 8/1971 | Epstein | 35/13 |
| 3,626,608 | 12/1971 | Ingeneri | 35/9 B X |
| 3,656,242 | 4/1972 | Atkinson | 35/19 A |
| 3,881,260 | 5/1975 | Hombs | 35/30 |
| 3,919,788 | 11/1975 | Ingeneri | 35/9 B X |
| 3,975,836 | 8/1976 | Broder | 35/30 |
| 4,091,550 | 5/1978 | Schrenk et al. | 35/19 A |

Primary Examiner—Vance Y. Hum
Attorney, Agent, or Firm—Nathan Edelberg; Robert P. Gibson; Fred M. Bush

[57] ABSTRACT

A wireless training device is disclosed which uses a digital computer to simulate or imitate electronic circuits, especially logic or computer circuits. Basically, a control program is selected by insertion of an edge encoded card. This card has on it a drawing of the circuit being taught as well as addressing information for use by the digital computer. Test points on the training card are holes, through which the test probe can contact the metal fingers of a test plane. The information derived from the test plane, as well as inputs from the various test switches, are operated on by the computer and control program to give output indications, usually in the form of lights. By putting the control programs in permanent memory (i.e. ROM or PROM) the student will be required to perform few preparatory steps. The unit is expandable by simply adding more programing to the memory chips and by drawing suitable training cards.

9 Claims, 13 Drawing Figures

SUBROUTINES

FIG. 13

WIRELESS LOGIC TRAINER

DEDICATORY CLAUSE

The invention described herein may be manufactured, used, and licensed by or for the Government for governmental purposes without payment to me of any royalties thereon.

BACKGROUND OF THE INVENTION

Trainers of the general type with which the invention is concerned are the type which use interconnecting wires and discrete components. Examples of this type are those made by ADD Corporation, Digiac, Inc. of New York, and Health Corporation of Benton Harbor, Michigan. A wireless type of trainer presently on the market is the Broder Logic Trainer. Although the Broder Unit is wireless, this present invention is dissimilar. The Broder unit uses a programable logic array, is not programable by the user, does not use edge encoded cards, and can not change computer function upon card insertion.

SUMMARY OF THE INVENTION

The present invention relates to vocational training in the field of computers and logic. The device imitates any logic device and any logic family presently used in computers, as well as many other electronic circuits. Expansion capabilities are virtually limitless. Simulation of a central processing unit can demonstrate computer actions. In an effort to minimize required training time, the wireless approach, i.e., inserting a program lesson card, greatly reduces the time necessary to set up the circuit. Since the present invention is software controlled in a committted application, very little effort by the student is required to begin the training sequence. The inclusion of a software test probe and test points can be used to simulate any logic family (TTL, DTL, RTL, etc.) characteristics, including malfunctions such as undefined open wire levels. The test probe data can also be used to determine which graphic display may be output to a CRT when teaching analog type circuits.

In direct contrast to the Broder unit, the present invention is capable of simulating any single logic device and allow signal tracing through complex circuits by use of test points in the program lesson card. Timed or clocked circuits are simulated with a selection of fast, slow, or single step clock action. In simulating clocked circuits, ring counters, BCD counters, serial adders, multipliers, and dividers may be taught. By use of software expansion, any complex computer circuit may be simulated as well as many analog circuits such as amplifiers, power supplies and oscillators if a graphic display is added to the trainer.

Under software guidance, the various logic circuits and the complex circuitry involved in a computer as well as most analog circuits are presented to the student. Each program lesson card, by use of its encoded edge, establishes which section of preprogramed memory is used to simulate the subject displayed on the card. Lamp displays give the result of student actions using data switches, step switches, or an automatic clock. The test probe can indicate logic states or determine analog graphics displays for electronic circuits if a graphics unit is added to the trainer.

To use, a student turns on the trainer, inserts a program lesson card, on which a schematic or circuit diagram is displayed, presses reset, and then maneuvers switches. A lamp display shows the result of switch movement, according to the placement of data switches, as established by the program lesson card. A logic test probe is utilized to reinforce signal tracing skills by use of: simulation, a seven segment readout, and test points (holes) in the program lesson card. Using a graphics display, analog circuits can be simulated by showing analog signals corresponding to the point of contact on the test plane.

DESCRIPTION OF THE PREFERRED EMBODIMENTS

Figure 1:
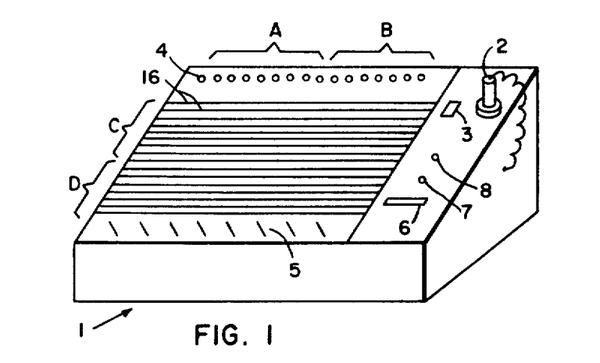
FIG. 1 is a diagrammatic drawing of a preferred embodiment of the wireless training device.

As shown in FIG. 1 the wireless trainer is built having a slope panel which serves as a test panel board 1. A portion of the panel contains metal strips or fingers 16 over which a program lesson card is inserted during operation. These metal strips are utilized by grounding a strip with a logic probe lead 2. When a strip is grounded, the resultant byte of information is transferred to a computer where the value is determined and the seven segment display 3 is manipulated or selectively activated to show proper output according to the program for the lesson card inserted.

A lamp display 4 across the top of the panel operates as a memory location. Data stored in the lamp display location is the result of program action dependent on input variables. Data switches 5 are used to manually change the contents of a memory location. This input memory location when read, establishes specific program action to take place, thus affecting the output lamp display 3.

A clock speed selector switch 6 determines whether clocking inputs are fast, slow, or stepped by a step switch 7. The clock speed switch is a simulated function and has no bearing on the operation of the computer clock. The trainer is automatically reset by the initial application of power or by depressing a reset switch 8.

Figure 2:
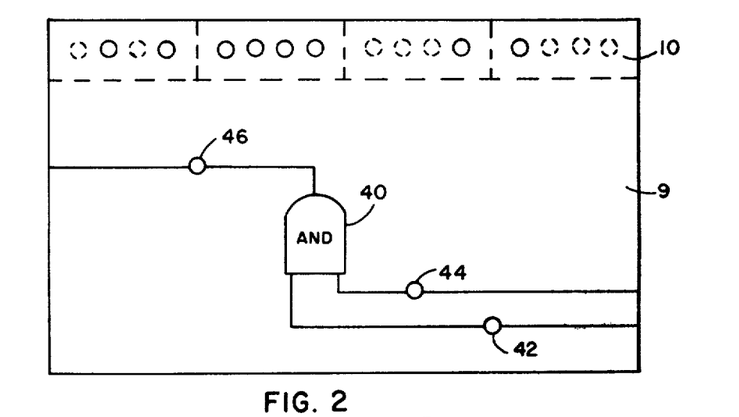
FIG. 2 is a drawing of an example training card.

FIG. 2 discloses a typical program lesson card 9 which is edge encoded 10 to establish an area in memory to be used as a starting address for the circuit shown on the card. The edge encoded data actually occupies addressable memory locations in the computer used as a branch command operand, thus establishing a starting address for a specific program application.

The card edge 10 is encoded with hole/no hole patterns for photo-cell detection of light passing therethrough. The data derived from these patterns is used by the computer to identify a software program which will simulate the particular circuit drawn on the card 9.

The drawing on the training card has specifically designated holes 42, 44, and 46 through which test probe 2 can contact the metal fingers 16 of the test plane board 1. The test plane is thus programed for use by software and the physical location of the test point holes on the training card 9. Any digital circuit and most analog circuits can thus be taught using particular schematic, wiring diagram, block diagram or other similar circuits placed on training cards 9 and writing software programs to achieve proper output functions for the circuit presently pictured.

Figure 3:
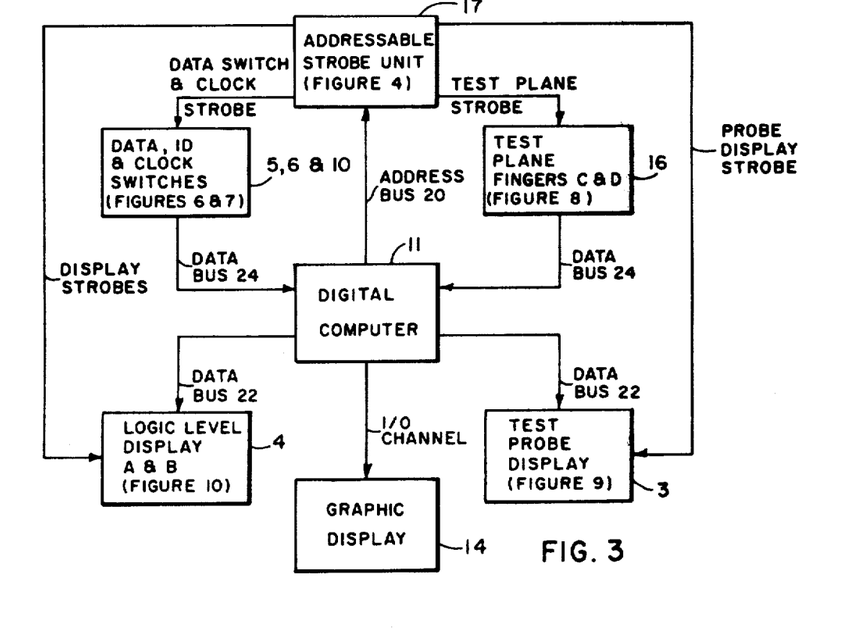
FIG. 3 is a block diagram of a preferred embodiment of the wireless training device.

FIG. 3 is a block diagram of a preferred embodiment of the electronic circuit of the present invention. The controlling programs are stored in the digital computer 11. Computer 11 coordinates output indications by lighting lamps in the logic level display 4, lighting segments of the test probe display 3, or outputting waveforms as graphics for analog simulations to a graphic display 14. Inputs to digital computer 11 come from photo electric identification of edge encoded 10 data, mechanical data from switches 5 and clock status switch 6, and from the test plane fingers or strips 16. The input and output data from the computer is placed on the appropriate data bus by the addressable strobe unit 17, shown in further detail in FIG. 4.

Figure 4:
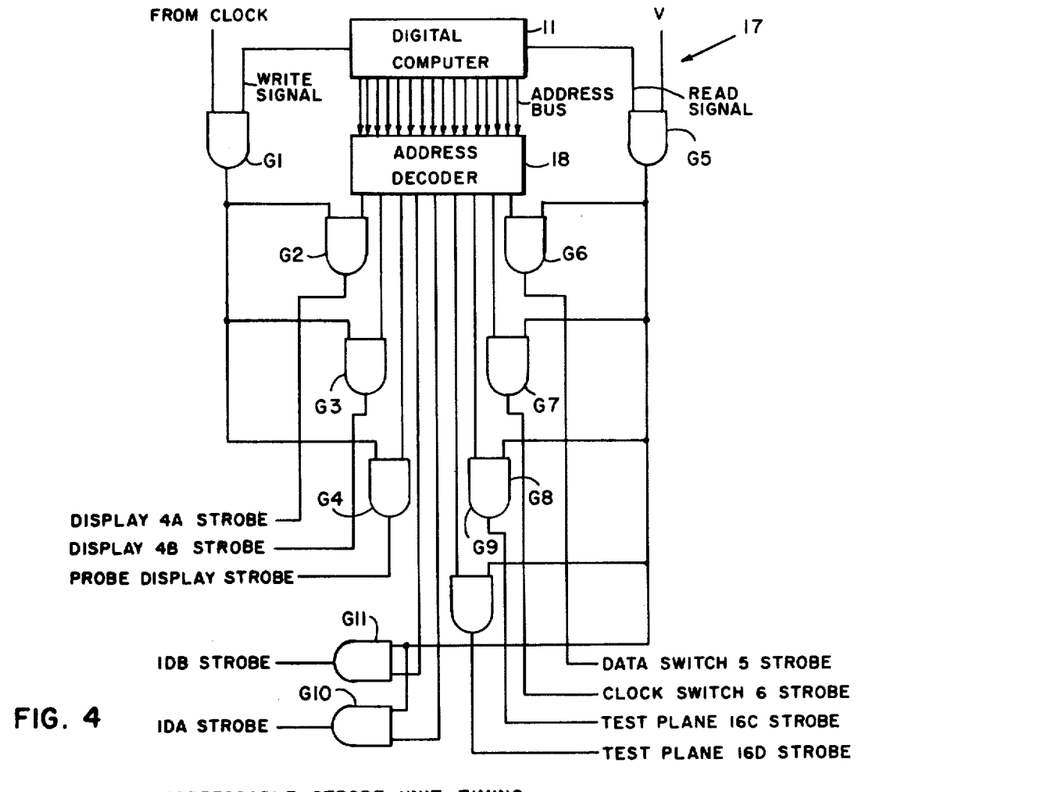
FIG. 4 is a schematic diagram of a preferred method of creating input/output strobes for obtaining and dispensing data to the slope panel display.

FIG. 4 is a schematic diagram which illustrates a preferred method of obtaining addressable strobes from the digital computer 11. An address decoder 18 of strobe unit 17 will only produce an active (high) output when that output is addressed. The output of gate G1 becomes active when the write signal from the digital computer 11 and the computer system clock are both active. The output pulse from gate G1 is applied to gates G2, G3, and G4. When enabled by the address decoder 18 and the pulse from gate G1 is applied, gate G2 outputs a pulse which will strobe the display 4A output device. The display 4A strobe is therefore a result of a selected address, computer write, and clock pulse, all active conditions existing in the trainer.

In a similar manner gate G3 outputs a pulse to strobe display 4B when selected by the address decoder 18 and enabled by gate G1. Gate G4 operates similarly by producing a strobe pulse for the seven segment probe display 3 when selected by the address decoder 18 and enabled by the pulse from gate G1.

Input strobes are also used to place input data on the data bus to be read by the computer 11. AND gate G5 has a constant or fixed input voltage V supplied to one input thereof. Gate G5 produces an active output only when an active read signal is applied from the computer 11 to the other input. The output of gate G5 is applied to gates G6, G7, G8, G9, G10, and G11.

Gate G6 will produce an active strobe, placing the data from the mechanical data switches 5 onto the data bus to be read by the computer 11, only when selected by the address decoder 18 and if the output of gate G5 is active.

When selected by the address decoder 18 gate G7, upon receiving an active input from gate G5, will issue an active strobe placing the clock switch 6 status data to be placed on the data bus and read by the computer 11.

Gates G8 and G9 work in a similar manner to gates G6 and G7. Gate G8 will enable the data from the test plane 16C to be read by the computer when selected by the address decoder 18 and the read signal from gate G5. Gate G9, when selected by the address decoder 18 and upon receipt of an active input from gate G5, will place data from test plane 16D on the data bus to be read by the computer 11.

The edge encoded data 10 on training card 9 is strobed onto the data bus by gates G10 and G11. An IDA strobe is the first byte of information from a card identifier circuit, and an IDB strobe is the second byte of information from a card identifier circuit. When enabled by the address decoder 18 and upon receipt of an active input from gate G5, gate G10 will issue the IDA strobe thus allowing the data read from the training card encoded edge 10 to go to the computer 11. When selected by a different address, gate G11 will issue the IDB strobe upon receipt of an active input from gate G5. The IDB strobe will allow further information from the encoded edge 10 of the training card 9 to pass to computer 11.

Figure 5:
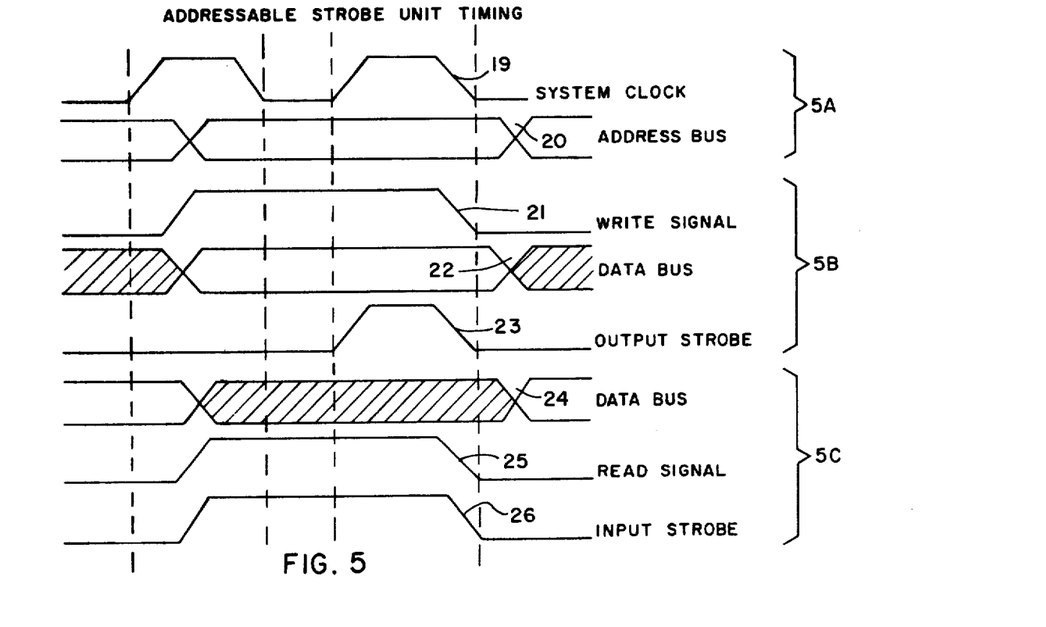
FIG. 5 is a timing diagram illustrating the necessary signals to input and output data to the computer.

FIG. 5 illustrates the timing chain developed by the addressable strobe unit in FIG. 4. FIG. 5A illustrates the system clock pulse 19 and the valid or stable address bus lines 20 which are common for development of both the output strobes and input strobes.

FIG. 5B in conjunction with FIG. 5A illustrates how the write signal 21 from the computer 11 relates to the system clock 19 and address bus valid signals 20. The data bus 22 is in an output condition, meaning data from the computer 11 is on the data bus. The output strobe 23 is the result of an AND operation of the write signal 21, the system clock signal 19, and the selected address from the valid address bus 20. The output strobe 23 occurs at a time when the data output from the computer 11 is available and settled on the data bus 22. The output strobe 23, which would appear as display strobes 4A, 4B, or probe display, can therefore be used to trigger a latch circuit thus capturing the output data.

FIG. 5C in conjunction with FIG. 5A illustrates how the strobes used for data input is derived. The address bus 20 must be in its valid address condition. The data bus 24 is made active by the read signal 25 enabling the computer 11 to take in data on the bus. The input strobe 26 is used to place the addressed data onto the bus to be sampled or read by the computer 11. The input strobe signal 26 is the result of an ANDing operation which ANDs the selected address 20 and the read signal 25. Data buses 22 and 24 may be separate or may be combined into one bi-directional bus, depending on the computer used.

Figure 6:
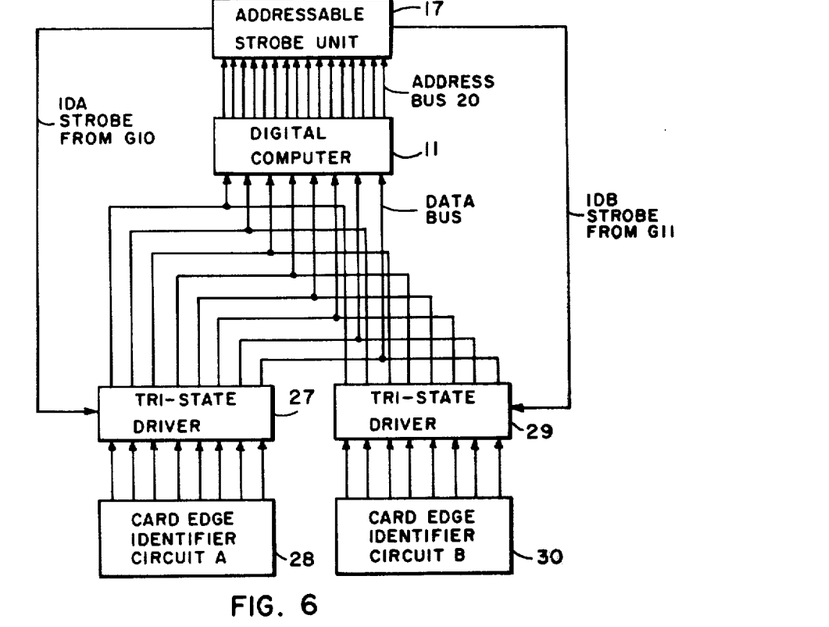
FIG. 6 is a block diagram of the card edge identifying input circuit.

FIG. 6 is a block diagram of the card edge identifier circuit to digital computer 11 interface. When, due to the operating program, the digital computer 11 places a selected address on the address bus lines, the addressable strobe unit 17 will create a logic level which activates the IDA strobe line. The IDA strobe takes the tri-state driver 27 out of its open circuit output condition and allows the data from the card edge identifier circuit A 28 to pass through and be present on the data bus, ready for input to the digital computer 11. The tri-state driver is a circuit which is capable of passing signals when enabled and exhibiting a high impedance (open) output characteristic when not enabled.

In a similar manner, a different address when received by the addressable strobe unit 17 will cause the IDB strobe to be issued. This IDB strobe takes the tri-state driver 29 out of its open circuit output condition and allows data from the card edge identifier circuit B 30 to be input to the computer 11.

The card edge identifier circuits 28 and 30 (standard transmit/receive photocell modules) are photo sensor arrays which read the data on the card edge 10 in the form of holes and no holes much like a Hollerith code. The information found on the encoded card edge 10 is used to establish the starting address of the software program for that particular training card 9. Although photo sensors are used to obtain the edge encoded data 10, it can also be done using mechanical switches and notches or magnetic strip readers such as found on small calculators.

Figure 7:
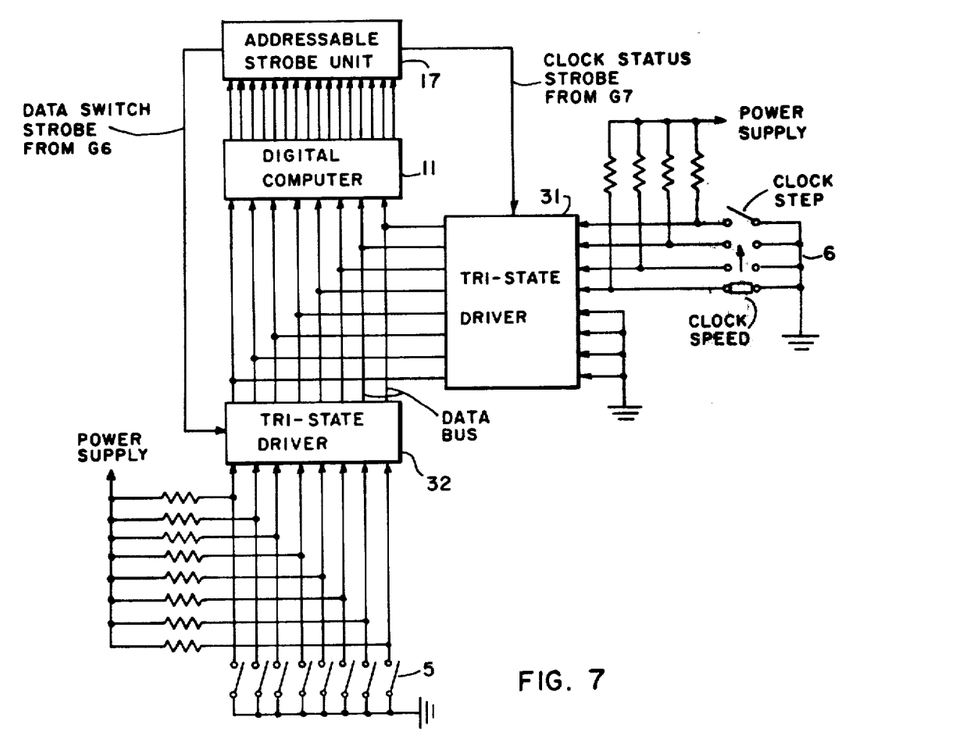
FIG. 7 is a block diagram of the data switch and clock switch input circuit.

FIG. 7 is a block diagram illustrating the data switch 5 input and clock speed status 6 switch inputs. When the digital computer 11 addresses the selected address, the addressable strobe unit 17 will activate the clock status strobe line. The active clock status strobe from G7 (FIG. 4) will take the tri-state driver 31 out of its open circuit condition thus placing the data from the clock speed and clock step switches 6 on the data bus to be read by the computer 11. In the software treatment of this data, the condition of the clock step switch is only considered when the clock speed switch is in the step position. In the step position the programer may incorporate programing which would look at the status of the pushbutton switch 7. In this manner, the trainer can discern whether or not a student is pressing the step (push button) switch expecting to see a change in output. The inputs to the tri-state driver 31 must be pulled up, insuring a known voltage level on a point that would otherwise be floating, such that an open switch line is at a logic high level. A logic low is established when a switch is closed thus making connection to ground.

In a similar manner, when properly addressed by the computer 11, the addressable strobe unit 17 will establish an active data switch strobe. The data switch strobe from G6 takes the tri-state driver 32 out of its open circuit condition thus allowing the data from the data switches to be input to the digital computer 11. Pull up resistors on the inputs of the tri-state driver 32 will ensure the presence of the proper logic levels to indicate which switch is closed or open.

Figure 8:
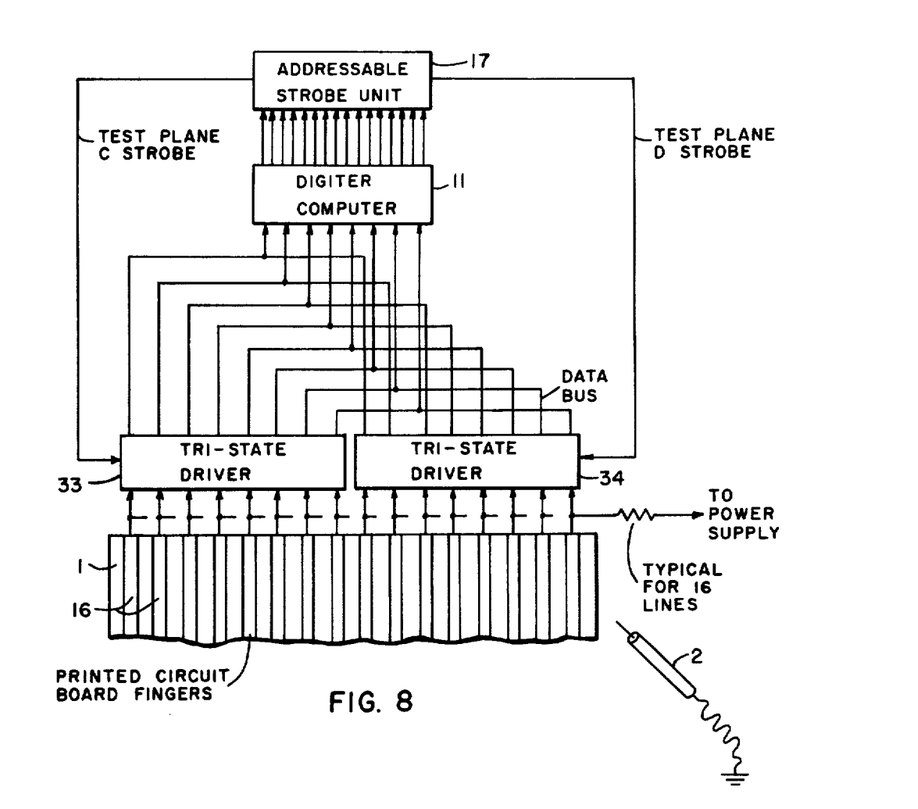
FIG. 8 is a block diagram and drawing of the test plane and the test plane input circuit.

FIG. 8 is a combination drawing of the printed circuit test plane and input circuit. Metal fingers 16 of the test plane are connected through tri-state drivers to the computer. When properly addressed by digital computer 11, the addressable strobe unit 17 will produce a test plane C strobe. The test plane C strobe from G8 takes tri-state driver 33 out of its open circuit condition allowing data from part of the metal fingers 16 to be input to the digital computer.

In a like manner, when the computer properly addresses the addressable strobe unit 17, a test plane D strobe is activated. The test plane D strobe from gate G9 takes the tri-state driver 34 out of its open circuit condition to allow data from the next set of metal fingers to be input to the computer. Typically, sixteen metal fingers are shown with 8 fingers being accessed through each driver. Additional addressable strobes, drivers, and fingers can be incorporated in a like manner for as many test strips 16 as desired. The input from each finger 16 to the respective tri-state driver 33 or 34 is pulled up through resistors. All inputs to the drivers are at the power supply level if the test probe 2 is not touching any metal fingers 16. When touching a strip 16 with the test probe 2, only that input line will become a ground potential line while the probe is contacting the finger. The software in the computer 11 can thus identify when and where a point is tested.

Figure 9:
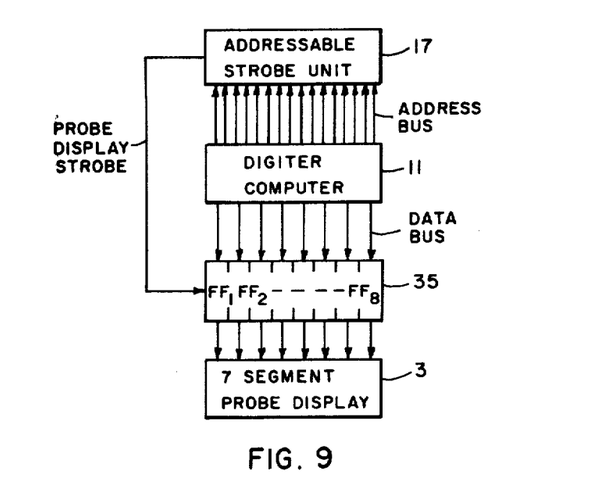
FIG. 9 is block diagram of the seven segment logic probe output display circuit.

FIG. 9 is a block diagram which illustrates how data is sent to the seven segment probe display 3. When properly addressed by the computer 11, the addressable strobe unit 17 issues a probe display strobe. The probe display strobe from gate G4 causes the data on the data bus to be caught and held by latch 35. The output of latch 35 will determine which segments of the probe display 3 will be illuminated. Individually operated flip-flops provide the latching action for each segment of the display.

The segments annunciate or indicate "O" for open, "L" for low, "H" for high, and "P" for pulse. A flashing decimal point can be used to indicate that no training card is inserted. All of these functions are controlled by the software program in the digital computer 11.

Figure 10:
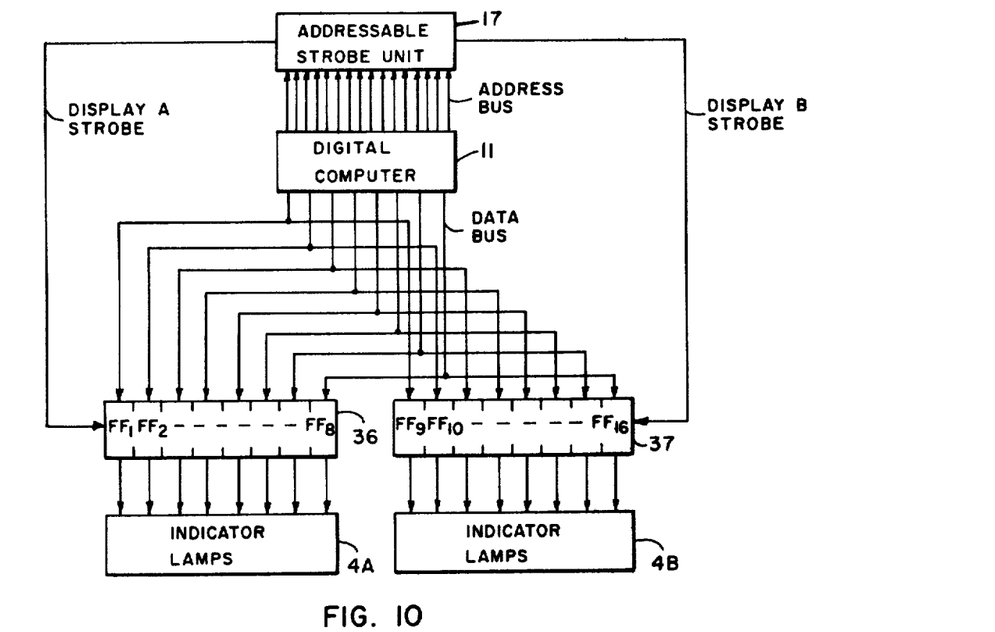
FIG. 10 is a block diagram of the indicator lamp output circuit.

FIG. 10 is a block diagram which illustrates how data is output to the indicator lamps 4 from the computer 11. When properly addressed by the computer 11, the addressable strobe unit 17 will issue a display A strobe. The display A strobe from gate G2 toggles latch 36 thus capturing and storing the data from the computer 11 in the latch. The output of latch 36 determines which of indicator lamps 4A are lit or unlit.

In a like manner, the computer 11 may also address the display B strobe through the addressable strobe unit 17. The display B strobe from G3 toggles latch 37 thus capturing the data on the data bus and storing it. The output of latch 37 determines which indicator lamps 4B are lit and unlit. As many indicator lamps as desired may be added using a similar arrangement of addressable strobes and latches.

Figure 11:
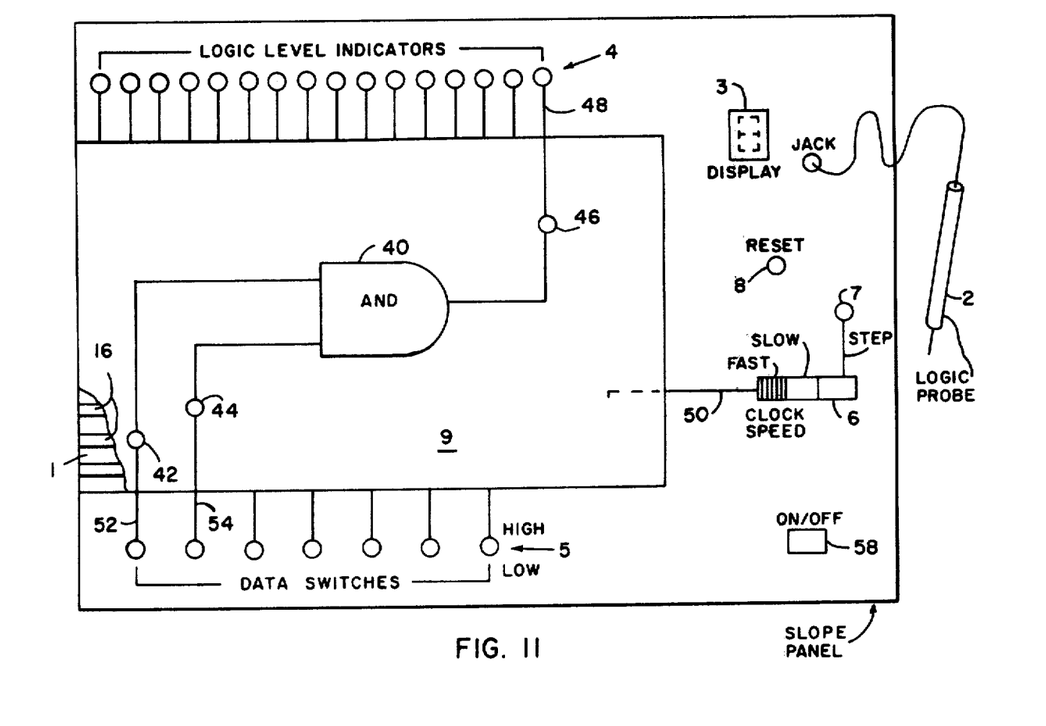
FIG. 11 is a drawing illustrating the slope panel display with a logic AND gate training card thereon.

FIG. 11 is a drawing of the slope display panel with an example training card 9 inserted. The encoded card edge 10 (not shown) establishes which program the computer 11 will run when the reset 8 button is pressed. The training card 9 has an AND gate 40 drawn on it. The inputs to the AND gate are drawn so they will align with particular switches 52 and 54 of data switches 5 selected by the programmer. Test point 42 and test point 44 are punched holes in the card which allow access to programmer selected test plane fingers 16 by test probe 2. The output line from the AND gate is drawn to align with a selected lamp 48 of indicator lamps 4. Test point 46 is a hole punched through training card 9 which allows a selected test plane finger 16 to be accessed by the test probe 2. The test point holes coincide with a portion of the drawing representative of a circuit element that would contain or have a signal passing therethrough. Thus test points 42, 44, and 46 represent respective AND gate inputs and output leads.

In operation, the logic probe display 3 indicates a "O" (for open) condition when test probe 2 is not touching a selected test plane finger 16. If both AND gate input switches 5 are in their low position, the indicator lamp 48 remains unlit. Touching test probe 2 to test point 42, 44, or 46 results in the logic probe display 3 indicating an "L" (for low). Moving the data switch 52 associated with test point 42 to the high position will not cause any change in the status of the unlit selected indicator lamp 48. Touching test probe 2 to test point 42 will now indicate an "H" (for high) on the probe display 3. Test points 44 and 46 will indicate an "L" when tested.

If both data switches 52 and 54 are in their high positions, the selected indicator lamp 48 will light showing a high output from the drawn AND gate. Furthermore, logic probe display 3 will indicate an "H" when test points 42, 44, and 46 are tested with test probe 2.

Although not used in this example, clock speed switch 6 and the clock step switch 7 are utilized in much the same way as the data switches 5. For circuits using a clock, a drawn line (shown dashed in) to point 50 would lead a student to this switch, the line indicating that the switch position affects the circuit operation. The programmer can make whatever use of this switch he desires to simulate conditions on the drawn circuit being taught. For example, the programmer can simulate a triggered flip-flop circuit utilizing switches 6 and 7 in such a manner that the student can see automatic fast and slow operation or put it in the step position and trigger the circuit at his own speed manually. An on/off switch 58 is used to turn the trainer power on and off.

Figure 12:
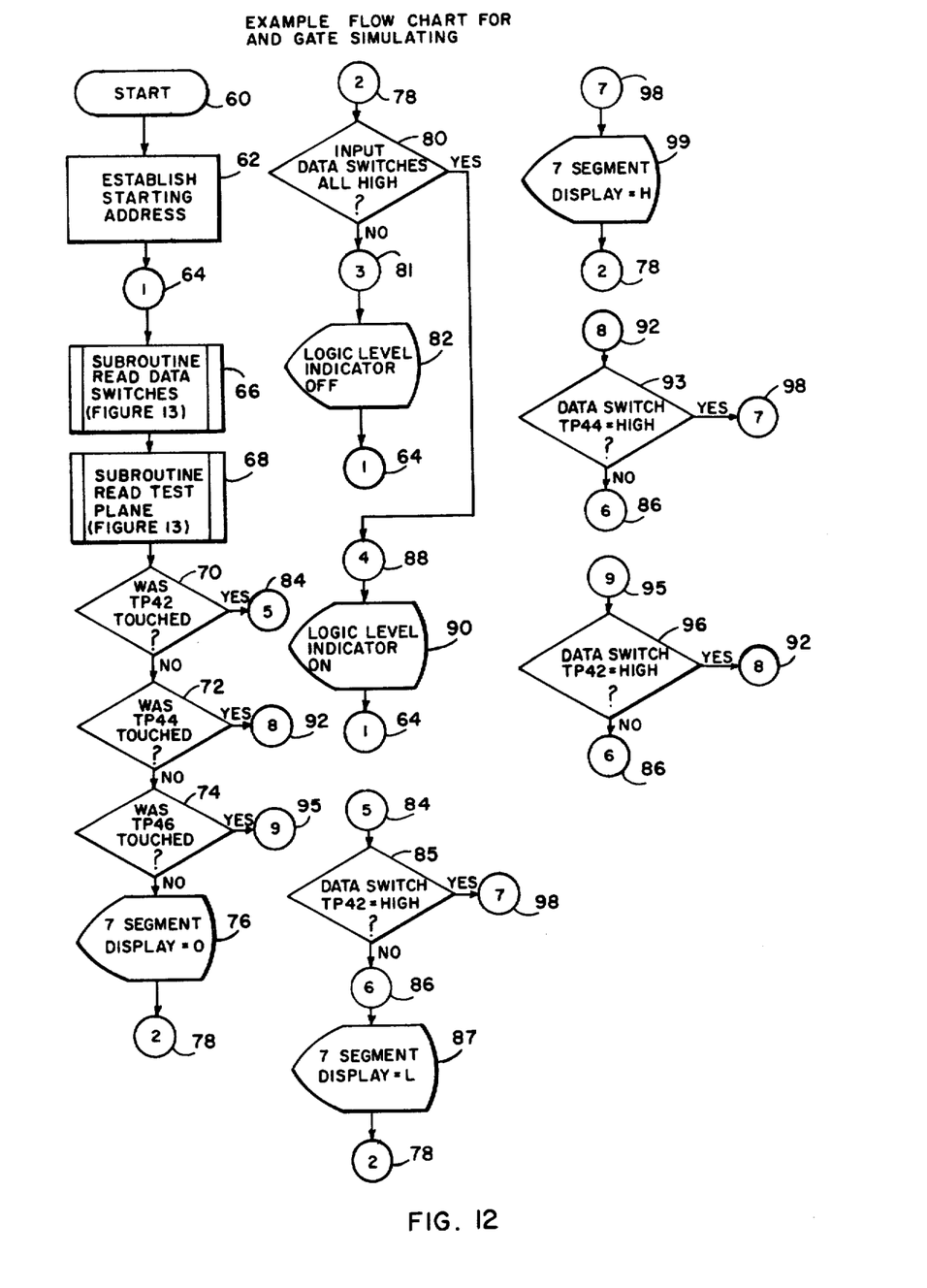
FIG. 12 is a flow chart illustrating the simulation of a logic AND gate with test points.

FIG. 12 is an example flow chart for the simulation of the AND training card 9 in FIG. 11. The start 60 of the program performs any necessary housekeeping steps such as zeroing data locations, and specifying key values. This occurs anytime reset switch 8 or power switch 58 is operated. The address of the desired program 62 must be established by reading the training card edge encoded 10 area. When the program address is established, the program then proceeds through connector 164 to a subroutine 66 which inputs the data from the data switches 5 into the computer 11.

After the read data switch subroutine 66, the program goes to a subroutine 68 which reads the data from the test plane fingers 16. From the input data a decision 70 must be made as to whether or not test point 42 was touched. If test point 42 was not touched, a decision 72 must be made as to whether or not test point 44 was touched. If test point 44 was not touched, a decision 74 must be made as to whether or not test point 46 was touched. If test point 46 was not touched, then the seven segment display 3 must display 76 an "O" (for open). The program then proceeds through connector 2 78 to a decision 80 which determines whether or not all the input data switches 5 are in a high position. If all selected input data switches are not in their high positions, the program goes through connector 3 81 and displays 82 the selected logic level indicator lamp 4 in an unlit condition. The program then repeats itself by going to connector 1 64 and continuing. If at decision 80 all selected input switches had been in their high position, then the program goes through connector 4 88 and displays 90 the selected indicator lamp 4 in a lit condition. Now the program repeats itself by going to connector 64 and continuing.

If test point 42 had been touched at decision 70, the program would have gone through connector 5 84 to a decision 85 concerning the status of the data switch 52 associated with test point 42. If the data switch 52 was not in its high position, the program would go through connector 6 86 and display 87 an "L" (for low) on the seven segment logic probe display 3. The program then proceeds to connector 2 78 and the decision 80 concerning the status of the selected data switches 5. Since switch 52 was not in its high position, the program goes through connector 3 81 and displays 82 the selected indicator lamp 4 in an unlit condition. The program then repeats itself by going to connector 1 64 and continuing. If the selected data switch 52 had been in its high position the program would have gone from decision 85 through connector 7 98 and display 99 an "H" on logic display 3. The program would then go to connector 2 78 and decision 80 concerning the status of all data switches as has been previously noted. The program would then repeat itself by going to connector 1 64 and continuing.

If test point 42 had not been touched but point 44 had been touched at decision 72, the program would have gone through connector 8 92 to decision 93. The decision 93 checks the status of the data switch 5 associated with test point 44 on the training card 9. If the test point 44 data switch 54 is not in its high position, the program goes to connector 6 86 and then displays 87 an "L" (for low) on the seven segment display 3. The program then goes to connector 2 78 where a decision 80 is made whether all selected data switches 5 are in a high position or not. Since the concerned data switches are not all high, the program goes through connector 3 81 and displays 82 the selected indicator lamp 4 in an unlit condition. The program then repeats itself by going to connector 1 64 and continuing. If switch 54 had been in its high position the program would have gone from decision 93 through connector 7 and display 99 an "H" on logic display 3. The program would then go to connector 2 and decision 80 concerning the status of the data switches as previously noted. The program then repeats itself by going to connector 1 and continuing.

If only test point 46 had been touched at decision 74, the program would go to connector 9 95 to perform the decision 96. The decision 96 checks the status of the data switch 52 associated with test point 42 on the training card 9. If the data switch 52 is not in a high position, the program goes to connector 6 86 and then displays 87 an "L" (for low) on the seven segment probe display 3. The program then proceeds to connector 2 78 and the decision 80 which checks the status of the selected data switches 52 and 54. At decision 80, since point 42 was "low", the concerned data switches are not all in their high condition, the program goes through connector 3 81 to display 82 the selected indicator lamp 4 in an unlit condition. The program then repeats itself by going to connector 1 64 and continuing. If at decision 96 the data switch 52 had been in a high position, the program would go to connector 8 92 and then make a decision 93 about the status of the other selected data switch 54. If data switch 54 is not in its high condition, the output of the simulated AND gate would be low so the program goes through connector 6 86 to display 87 and "L" (for low) on the seven segment probe display 3. The program then goes to connector 2 78 and decision 80. At decision 80 the program again takes the "No" route, going through connector 3 81 to display 82 the selected indicator lamp 4 in an unlit condition. The program then repeats itself by going to connector 1 64. If at decision 93 the concerned data switch 54 was in the high position, then the program would have gone to connector 7 98 and then display 99 an "H" on the seven segment probe display 3. The program then goes to connector 2 78 where it must take the "yes" branch to connector 4 88 since all concerned data switches 5 are in the high position. Connector 4 88 leads to display 90 which displays the selected indicator lamp 4 in the lit condition. The program then repeats itself by going to connector 1 64.

The repetition of program runs results in instantaneous changes due to changing real world conditions. This means any changes made in the monitored inputs will be reflected immediately by the proper output indication. The program repeats itself until the training card is removed or power is turned off, thereby allowing the operator to operate the device at his own speed.

The clock status switch 6 is used as a real world input for those circuits which have toggled or timed functions. The program involving the clock status switch 6 would require a reading subroutine and the proper decisions in order to be incorporated. Reading the clock switch 6 status would take a subroutine similar to the read data switch subroutine 66.

Figure 13:
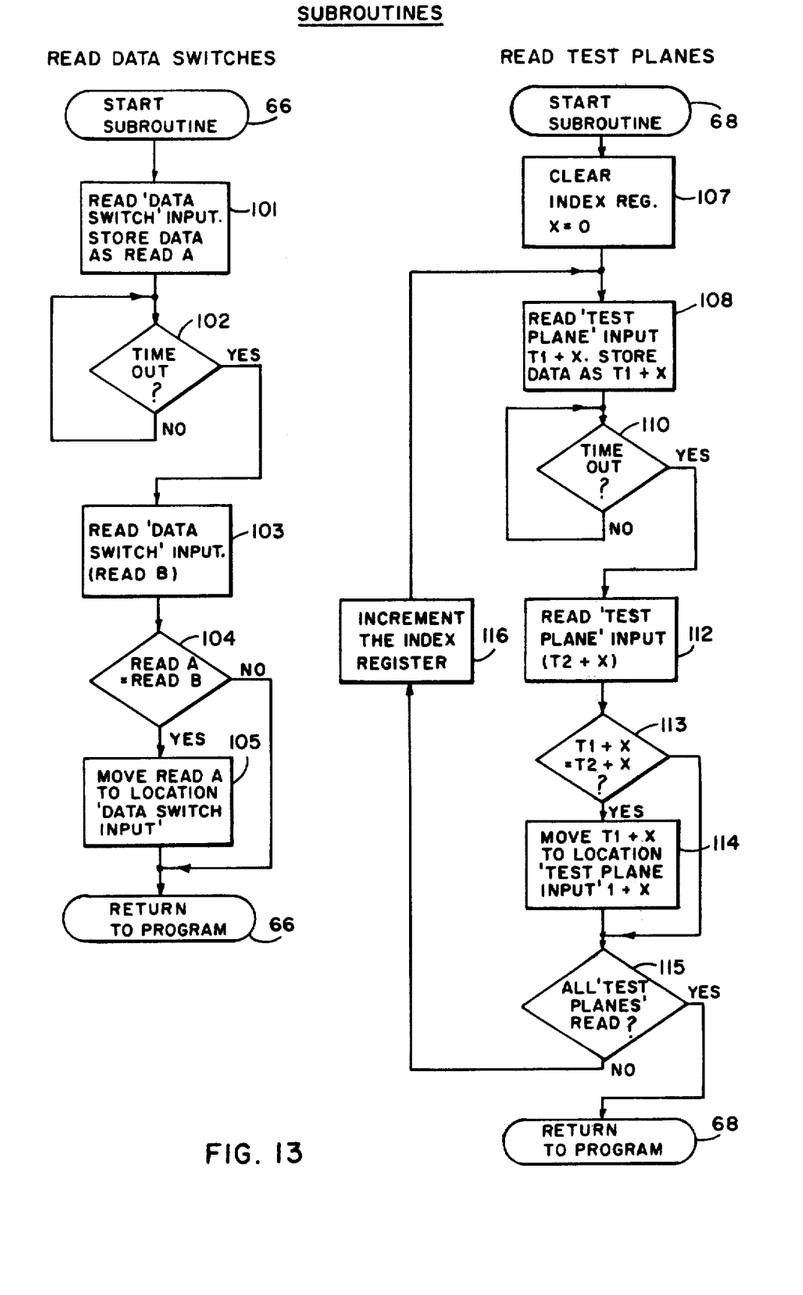
FIG. 13 is a flow chart illustrating subroutines used by the AND gate simulation program.

FIG. 13 contains flow chart diagrams for the subroutines 66 and 68 called for in FIG. 12. The read data switches 5 subroutine 66 starts by reading the input data and storing it as "Read A" 101. Decision 102 is a time delay decision. The time out decision 102 allows for mechanical switch or contact debouncing without hardware circuits by waiting a given period of time before reading the data switch 5 input operation 103. Decision 104 compares the data from the two read operations 101 and 103. If Read A and Read B are equal, the operation 105 takes Read A and moves it to a location selected to hold the valid data switch 5 input data. The subroutine then returns to the main program subroutine 66 block from which it was called. If at decision 104 Read A and Read B did not match, the subroutine would simply go back to the main program subroutine 66 from which it was called. This results in the main program using the same data switch 5 data as it used in the previous run. Only when the data is the same after a read-delay-read sequence will the data supplied to the main program change.

The subroutine 68 for reading test planes 16 is based on the same principle as the read data switch 5 subroutine 66. The main difference is that there are more test planes 16 than there are data switches 5. The read test plane 16 subroutine 68 therefore incorporates an indexed loop.

The subroutine 68 starts by performing housekeeping chores, such as clearing the index register operation 107. Next, the data on the first test plane is read and stored as T1+ the contents of the index register by operation 108. The time out decision 110 delays a suitable length of time to allow setting of any bouncing switch contacts. When time is out the program takes the decision 110 "yes" route to perform another read operation 112 called T2+ the contents of the index register. T1+X and T2+X are compared by decision 113. If they are equal, the data is moved from T1+X to a location selected as the "Test Plane Input" location 1+X by operation 114. If T1+X did not equal T2+X in decision 113, the operation 114 would be bypassed, thus leaving the data supplied to the main program as "Test Plane Input" 1+X unchanged from its previous value. Whether coming from the decision 113 or the operation 114, the program will come to the loop decision 115. If all planes have not been read, an increment operation 116 will occur adding one to the contents of the index register and the program will once again start through the subroutine at operation 108. When all test planes 16 have been read, the decision 115 will cause the program to take the "yes" route thus returning to the subroutine 68 in the main program from which it had been called.

The wireless logic trainer can be operated with substantially all of the components being off the shelf items. For example:
Address decoder 18—SN74154 Decoder Chip
Tri-state driver—SN74126 or SN74125
Probe display 3—MAN-3
Computer 11—MOS Technology-KIM I (or other similar computer)

While the invention has been described in connection with certain specific embodiments thereof, it will be understood that other modifications will support themselves to those skilled in the art and that it is intended to cover such modifications that fall within the scope of the claims appended hereto.

I claim:
1. A training device for simulating electronic circuits comprising:
   test panel means for indicating selectable simulated conditions of an electronic circuit in response to manual variation of input conditions, and adapted to respond to encoded circuit data for establishing a circuit to be simulated:
   computer means coupled to said test panel means for receiving input data signals therefrom and outputting response signals thereto for indicating selected simulated circuit conditions and for providing gating control signals thereto;
   a plurality of training circuit cards having respective circuit diagrams thereon for simulation, said cards being adapted for individually encoding said test panel means;
   said test panel means having manually operable input switches coupled between parts of said circuit diagram and said computer means for simulation of changing conditions of an electron circuit by manually changing the state of respective switches;
   a plurality of parallel, conductive metal strips disposed in the surface plane of said panel means, said strips being coupled to provide respective inputs to said computer means and being covered by one of said training cards when said card is disposed for encoding said panel means; and
   an addressable strobe means for responding to control outputs of said computer means output signals to selectively gate said computer means input signals from said switches and metal strips and said output signals for indicating simulated circuit conditions.

2. A training device as set forth in claim 1 wherein said test panel means further comprises card identifier circuit means adapted for identifying said individually encoded training cards and coupled to said computer means for coupling such identifying data to said computer means.

3. A training device as set forth in claim 2 wherein said test panel means further comprises a first display means responsive to the output of said computer means for selectively indicating the simulated presence or absence of a desired signal at selectable points on the respective circuit diagram cards;
   a test probe for manually being placed in contact selectively with said metal strips for changing the input coupled to the computer while said probe is contacting a selected strip; and
   a second display means responsive to the output of said computer means for indicating a simulated circuit condition while said probe is contacting a selected strip.

4. A training device as set forth in claim 3 wherein said training circuit have predetermined test point holes within the circuit diagram thereof and positioned so that each test point hole is located over a desired one of said metal strip so that the test probe can be inserted through said hole to contact the desired strip and thereby initiate the proper response from the computer means.

5. A training device as set forth in claim 4 wherein said training cards are edge encoded along one side of the card for identifying said card for the card identifier circuit means.

6. A training device for simulating electronic circuits comprising:

test panel means for indicating selectable simulated conditions of an electronic circuit in response to manual variation of input conditions, and adapted to respond to encoded circuit data for establishing a circuit to be simulated;

computer means coupled to said test panel means for receiving input data signals therefrom and outputting response signals thereto for indicating selected simulated circuit conditions and for providing gating control signals thereto;

a plurality of training circuit cards having respective circuit diagrams thereon for simulation, said cards being adapted for individually encoding said test panel means;

said test panel means having manually operable input switches coupled between parts of said circuit diagram and said computer means for simulation of changing conditions of an electron circuit by manually changing the state of respective switches;

a plurality of parallel, conductive metal strips disposed in the surface plane of said panel means, said strips being coupled to provide respective inputs to said computer means and being covered by one of said training cards when said card is disposed for encoding said panel means; and     an addressable strobe means for responding to control outputs of said computer means output signals to selectively gate said computer means input signals from said switches and metal strips and said output signals for indicating simulated circuit conditions; said addressable strobe means comprising address decoder means coupled to receive output gating signals from said computer means;

a first AND gate adapted to receive a write signal input from said computer means and adapted to receive a clock input;

a second AND gate adapted to receive a read signal input from said computer means and adapted to receive a fixed voltage input; and     a plurality of AND gates each having first and second inputs and an output, said first inputs being adapted to receive output signals from said decoder means, and said outputs being adapted for providing said computer means gating control signals to gate or strobe respective input and output circuits coupled to said computer means for selective operation of said circuits;

selective of said plural AND gates having their second inputs coupled in common to the output of said first AND gate for gating output circuits coupled to receive output data from said computer means; and     the remainder of said AND gates having their second inputs coupled in common to the output of said second AND gate for selectively gating or strobing input circuits coupled to said computer means.

7. A training device as set forth in claim 6 wherein said test panel means further comprises card identifier circuit means adapted for identifying said training cards and coupled to said computer means for coupling such identifying data to said computer means, and wherein said training cards are edge encoded along one side of the card for identifying said card for the card identifier circuit means.

8. A training device as set forth in claim 7 wherein said test panel means circuits comprise a first display means responsive to the output of said computer means for selectively indicating the simulated presence or absence of a desired signal at selectable points on the respective circuit diagram card;

a second display means responsive to the output of said computer means for indicating a simulated circuit condition; and     a test probe for manual, temporary contact selectively with said metal strips for changing the input coupled to the computer while said probe is contacting a selected metal strip.

9. A training device as set forth in claim 8 wherein said training circuit diagram cards have test point holes prelocated within the circuit diagram so that each hole is positioned over a desired one of said metal strips when the training card is properly positioned on the test panel so that the test probe can be inserted through a hole, contacting the desired strips and thereby initiating the proper response from the computer means.

* * * * *